Figure 1:
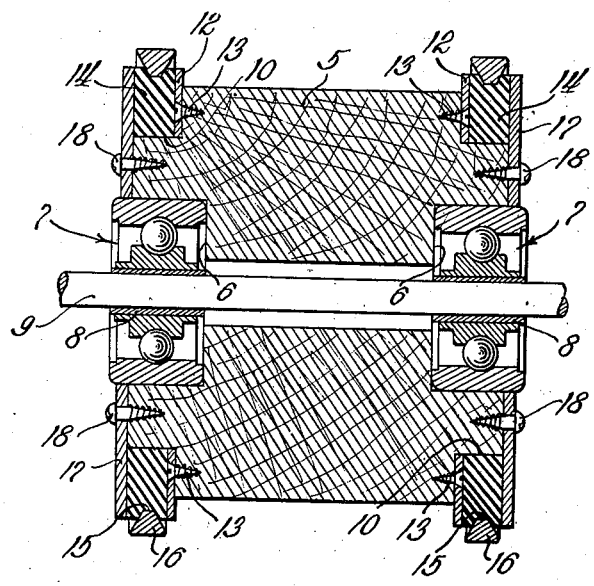

March 9, 1943.   S. R. SMITH   2,313,277
WHEEL
Filed Feb. 7, 1941

Inventor:
Sam R. Smith
By Walter E. Schirmer
Attys.

Patented Mar. 9, 1943

2,313,277

UNITED STATES PATENT OFFICE 2,313,277

WHEEL

Sam R. Smith, South Bend, Ind.

Application February 7, 1941, Serial No. 377,769

6 Claims. (Cl. 301—5)

This invention relates to wheels, and more particularly is concerned with an improved design of wheel for use in coasting devices, such as those disclosed in my Patent No. 2,170,978, issued August 29, 1939.

The present construction has for one of its primary purposes to insulate the wheel tread from the remainder of the wheel structure and to employ the use of a simple wood turning as the hub and main body portion of the wheel.

The present construction also lends itself admirably to the forming of either a metal tired wheel or a rubber tired wheel, depending upon the particular desires of the operator.

Another feature of the present invention is the provision of a construction which will prevent possible cracking of the wooden hub of the wheel, and is so designed as to eliminate, to a large extent, any severe strains on the hub.

Still another feature of the present invention is to provide a structure which is simple and economical in design, can be readily assembled, and can be easily repaired or the tire treads replaced when desired.

Other objects and advantages of the present construction will appear more fully from the following detailed description which, taken in conjunction with the accompanying drawing, will disclose to those skilled in the art the particular construction and operation of a preferred form of the present invention.

Figure 2:
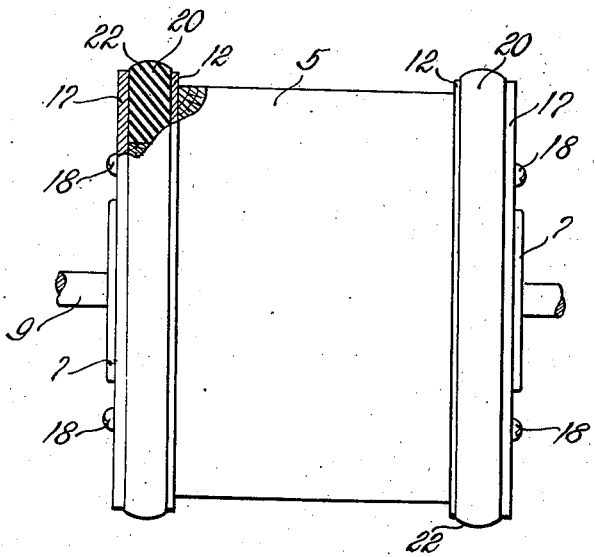

In the drawing:

Figure 1 is a sectional view through a metal tired wheel embodying the present invention; and Figure 2 is an elevational view with a portion broken away showing the same wheel structure designed with a rubber tread.

Considering now in detail the structure shown in Figure 1, a wheel body member 5 is provided which is formed of a wood turning, which may be cut out on a lathe or the like and which preferably is soaked in oil to season the same and prevent it from splintering or cracking. The body 5 is provided at opposite ends with recesses 6, which recesses are designed to receive bearing means 7. The bearing means are in the form of roller skate wheels having inner sleeve portions 8 through which extends an axle 9. The axle 9 may be formed of a large spike or the like for simplicity and economy in structure, and the wheel body 5 is rotatably supported thereon by means of the skate wheel 7.

The outer peripheral edges of the wheel body 5 are axially recessed, as indicated at 10, to form radially shouldered portions adapted to receive the washer members 12. These washer members are secured in radial abutment against the shoulders of the outer recesses by means of screws 13 extending axially into the radial shoulders.

Disposed in abutment against the outer faces of the washers 12 and compressibly seated about the annular shoulders 10 are rubber rings 14, which rings preferably are formed to an internal diameter smaller than the annular surfaces 10, and must be expanded over a cone or the like into position on the shoulders 10, whereby they firmly engage on these shoulders and are compressibly held thereon.

The rings 14 are provided with external annular grooves 15 in the outer surface thereof, which grooves 15 are adapted to receive metal rim members 16 snapped therein and held thereby in insulated relation with respect to the wheel hub and the washer 12.

An outer face plate 17 is secured against the outer radial face of the rubber rings 14 to compress the same firmly in position and expand the same slightly radially to insure that the tired rims 16 will be held in position. The plates 17 are secured in position by means of screws 18, and it will be noted, fit closely around and bear about the outer races of the skate rollers 7, whereby a portion of the load is transmitted directly to the rollers through the plates 17.

With such a construction it will be readily apparent that the rims 16 do not have any metal or rigid contact with the wheel body 5, and consequently are resiliently supported so that slight irregularities in the surface over which the wheel rolls will be absorbed by this resilient support. At the same time, the rubber rings 14 are firmly held in position between the washers 12 and plates 17 so there is no possibility of creepage of the rings or lateral spreading which might bring the tire tread surfaces 16 down into contact with the plates. The mechanism is easily assembled or disassembled by means of the screws 18 and 13, and provides a very cheap and economical wheel, which also has the distinct advantage of having axially spaced tread surfaces which provide for lateral stability to prevent the coasting device on which the wheel is employed from falling over when left in a standing position.

In Figure 2 I have disclosed a slightly modified type of structure in which the rubber rings 14 are replaced by rubber rings 20, the rings 20 being of substantially the same shape, so far as internal diameter is concerned, as the rings 14, but having no annular groove 16 in the external surface thereof and on the contrary, being slightly concave on the external surface so that when the plates 17 are drawn up into position to axially compress the rings 20, the concave surfaces 22 will act as tread surfaces to provide a quiet running wheel with some shock absorbing characteristics.

The same features of lateral stability are incorporated into the wheel of Figure 2 by means of axially spacing the rings 20, as is found in the structure of Figure 1. Due to the axial compression of the rings 20, the surfaces 22 will not be forced inwardly sufficiently so that the vehicle will run on the plates 12 and 17, and the surfaces 22 will last for a very long period of time due to the manner in which the rubber is secured in position and maintained against displacement.

It is therefore believed apparent that I have provided a novel type of wheel structure for this purpose, and it is to be understood that I do not intend to be limited except as defined by the scope and spirit of the appended claims.

I claim:

1. A wheel structure comprising a body member having axially directed end recesses, anti-friction bearing means disposed in said recesses, an axle extending through said bearing means, peripheral recesses in the sides of said body member, resilient means disposed in said recesses and projecting radially beyond the outer annular periphery of said body member, means axially compressing said resilient means, and metallic tire members carried in axially spaced relation on the external surfaces of said resilient means.

2. A wheel comprising a wood body member having an axial bore therethrough provided with axial end enlargements, bearing means in said enlargements for supporting said wheel upon an axle, said bearing means projecting axially beyond the sides of said body member, said body member having peripheral annular recesses formed in the sides thereof, a metal plate secured to the radial surface of each of said recesses and projecting radially outwardly beyond the periphery of said body member, a second metal plate of the same outer diameter as said first plate secured to the sides of said body member radially inwardly of said recesses and centered on the extensions of said bearing means to form with said recess and first plate an outwardly directed channel, and annular rubber members disposed in said channels and axially compressed between the associated metal plates.

3. The combination of claim 2 further characterized by the provision of an external annular groove in each of said rubber rings, and a metal tread member carried in said groove and projecting radially outwardly of the peripheries of said plates.

4. The combination of claim 2 further characterized in that the outer annular surface of said ring members are convex and form axially spaced surfaces for supporting said wheel on the ground.

5. In combination, a wheel body member having centrally disposed axially inwardly directed end recesses, anti-friction bearing means carried in said recesses for supporting said body member for rotation about an axle, axially inwardly formed recesses about the periphery of the body member at the sides thereof, and resilient means axially compressed in said peripheral recesses and having an annular V-shaped groove carrying metallic tread means for supporting said wheel at axially spaced points upon the ground.

6. A wheel comprising a non-metallic rigid body member having radially extending peripheral surfaces defined by axially outwardly directed annular surfaces, a first plate secured against said radial surfaces and projecting radially outwardly of said body member, a second plate of corresponding radial length secured to the sides of the body member and defining with said first plate an outwardly directed channel, a rubber ring disposed within said channel and compressed thereby so as to have a radial extent greater than said plates whereby the peripheral surfaces of said rings form axially spaced resilient treads for the wheel.

SAM R. SMITH.